Nov. 5, 1968   P. L. CIACCIO   3,408,675
ROTARY ROOT CUTTER
Filed Feb. 13, 1967

INVENTOR.
PETER L. CIACCIO
BY
Lynn H. Latta
-ATTORNEY-

United States Patent Office 3,408,675
Patented Nov. 5, 1968

3,408,675
ROTARY ROOT CUTTER
Peter L. Ciaccio, Los Angeles, Calif., assignor to Flexible, Inc., Pittsburgh, Pa., a corporation of Delaware
Filed Feb. 13, 1967, Ser. No. 615,672
6 Claims. (Cl. 15—104.09)

ABSTRACT OF THE DISCLOSURE

Disclosed herein is a rotary cutter of the type comprising a spiral band with saw teeth on one or both margins thereof, having at the center of the spiral a terminal portion which functions as a hub to transmit rotary drive to the outwardly-spiraling toothed blade. The blade is of shallow channel section, convex on its radially outer side, and the teeth are slanted inwardly from rounded shoulders adjacent the toothed margins, so as to be spaced away from the wall of a sewer pipe against which the cutter may be rotating.

Background of invention

Figure 3:
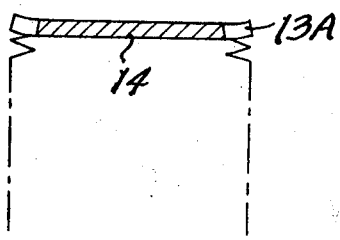

Root-cutters of toothed, spiral band form, for clearing sewer pipes that are congested with tree roots, etc., have been used for many years in the sewer-cleaning art. Such cutters have been made of flat band steel, notched along its margins to provide cutting teeth, and then rolled into spiral form. An incidental result of the rolling has been to tilt the teeth slightly outwardly from the plane of the web portion of the band, as shown in FIG. 3 of the drawing. In the rotary operation of such root cutters, it is virtually impossible to maintain the axis (of rotation) of the cutter parallel to the axis of the sewer piper, and it frequently happens that the cutter will be tilted with reference to a sewer wall against which it is being rotated. When this happens the teeth will tend to dig into the wall of the sewer pipe and will wear down rapidly as the result of the abrasion of the teeth against the sewer pipe wall. The cutting efficiency of the cutter is thereby reduced and the cutter eventually becomes useless.

Occasionally the user of a root cutter of this type will drive it in the direction reverse to its intended direction of rotary operation. The teeth then tend to become caught against the wall of the sewer pipe or against an obstruction therein. This will occur at the outer end of the spiral blade, and as the center of the cutter continues to be driven (in a direction tending to unwind the spiral) the cutter will often be unwound and opened up to an extent exceeding the resiliency yield point of the blade, with the result that it is permanently deformed and thereby rendered useless.

Summary of invention

The general object of the invention is to provide an improved root cutter eliminating the objectionable features described above. More specifically, the invention provides a spiral root cutter having means to prevent its teeth from catching against the wall of a sewer pipe, and having reinforced strength to resist opening in the event it should be rotated in reverse (in the unwinding direction). These objects are accomplished by providing the cutter blade with a cross-section of shallow channel form, with rounded shoulders joining the respective sides of a body web to the teeth on the respective margins of the blade, whereby the teeth are tilted inwardly from the circumference of the web and one of the rounded shoulders will bear against the sewer pipe wall if the rotary axis of the cutter becomes tilted, and the teeth will be held out of contact with the sewer pipe wall as the result of such bearing engagement of the rounded shoulder.

Figure 1:
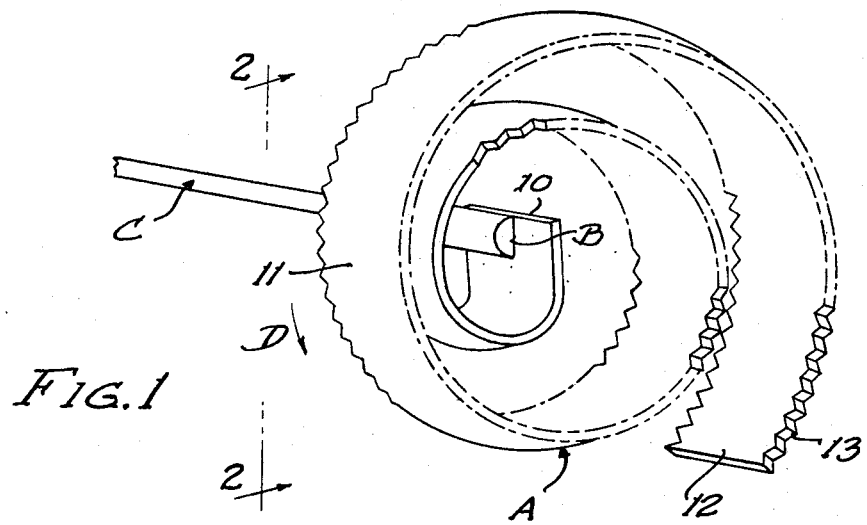
Figure 2:
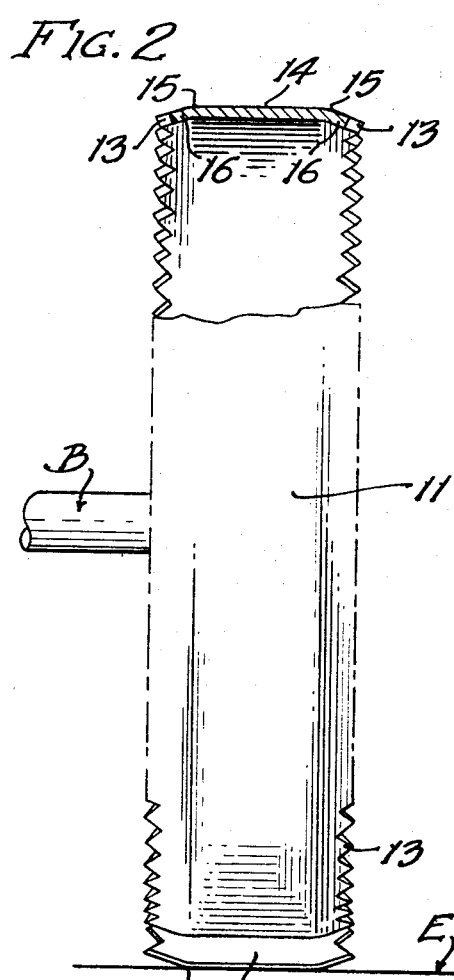

These and other objects will become apparent in the ensuing specifications and appended drawing, wherein:
FIG. 1 is a perspective view of a rotary root cutter embodying the invention;
FIG. 2 is a side elevational view thereof, with a portion shown in section; and
FIG. 3 is a fragmentary cross-sectional view illustrating the prior art.

Description of invention

Referring now to the drawing in detail, I have shown therein, as an example of one form in which the invention may be embodied, a rotary root cutter comprising a spiral blade A and a driving coupling B at the center thereof, to which a drive rod C can be coupled, for rotating the cutter, normally in the direction indicated by the arrow D.

Cutter blade A is of strap metal, with a central tab 10 secured to coupling B, an intermediate body 11 spiralling outwardly from tab 10, and a free outer end 12. Cutter teeth 13 are notched in the respective margins of the intermediate body 11 and outer end portion 12. The features described thus far are conventional in the prior art cutters, with the exception that the teeth 13A, as shown in FIG. 3, are tilted slightly outwardly.

The invention is characterized by a cross-section of shallow channel form, as shown in FIG. 2, embodying a body web 14 parallel to the rotary axis (e.g. of coupling B); a pair of rounded shoulders 15 adjacent respective sides of the blade, and marginal portions 16 which are slanted conically inwardly from shoulders 15, the teeth 13 being formed in the conically slanted marginal portions 16 and thus offset within the periphery of the blade as defined by the outer surface of web 14. Thus it is possible for the cutter to be tilted with reference to a sewer pipe wall E (FIG. 2) without bringing the teeth 13 into contact with the wall E. Instead, one of the rounded shoulders 15 will bear against the sewer pipe wall E with a smooth sliding action, avoiding abrasion. When the rotary axis of the cutter is parallel to the sewer axis, the web 14 will engage the wall E as shown in FIG. 2 with minimum friction and wear.

The channel section stiffens and thus reinforces the blade so as to provide very substantially increased resistance to opening of the cutter by unwinding action. This characteristic, coupled with the freedom from catching of the teeth 13 against the pipe wall E in the event of reverse rotation, substantially eliminates the likelihood of permanent distortion of the cutter by opening.

The slanted marginal portions 16 define obtuse angles of more than 135° with reference to web 14. The angle is preferably at least 150° and may be in the range from 135° to 165°.

I claim:
1. A rotary root cutter for sewer clearing, including a blade of strap metal of spirally coiled form having at its inner end means to receive rotary drive and having an intermediate body spiraling outwardly from said inner end and terminating in a free end, said blade having in at least one of its side margins a plurality of cutting teeth;

said blade being characterized in being of shallow channel section, convex on its peripheral surface, including a body web, said teeth being slanted from said shoulder toward the rotary axis of the cutter, and thereby offset inwardly from the periphery of the blade so as to remain out of contact with said sewer pipe wall, said channel section providing reinforcing stiffness in said blade to resist opening of the cutter by unwinding action in the event of reverse rotation of the cutter in the unwinding direction and catching of said free end against an obstruction during such reverse rotation.

2. A cutter as defined in claim 1, wherein said shoulders are rounded providing bearing surfaces for smooth sliding engagement with the inner wall of a sewer pipe.

3. A cutter as defined in claim 1, including frusto-conical marginal portions tapering toward said axis from said shoulders, said teeth being formed in said marginal portions.

4. A cutter as defined in claim 1, including frusto-conical marginal portions tapering toward said axis from said shoulders, said teeth being formed in said marginal portions, said marginal portions defining obtuse angles with reference to said web.

5. A cutter as defined in claim 1, including frusto-conical marginal portions tapering toward said axis from said shoulders, said teeth being formed in said marginal portions, of more than 135°, obtuse angle.

6. A cutter as defined in claim 1, including frusto-conical marginal portions tapering toward said axis from said shoulders, said teeth being formed in said marginal portions, of at least 150°, obtuse angle.

References Cited

UNITED STATES PATENTS

| | | | |
|---|---|---|---|
| 2,756,447 | 7/1956 | Hogan | 15—104.1 X |
| 3,025,547 | 3/1962 | Ciaccio | 15—104.3 |

EDWARD L. ROBERTS, *Primary Examiner.*